United States Patent
Kobayashi et al.

(10) Patent No.: US 7,363,411 B2
(45) Date of Patent: Apr. 22, 2008

(54) EFFICIENT SYSTEM MANAGEMENT SYNCHRONIZATION AND MEMORY ALLOCATION

(75) Inventors: Grant H. Kobayashi, Beaverton, OR (US); Barnes Cooper, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 742 days.

(21) Appl. No.: 10/680,615

(22) Filed: Oct. 6, 2003

(65) Prior Publication Data

US 2005/0086405 A1   Apr. 21, 2005

(51) Int. Cl.
G06F 13/24 (2006.01)

(52) U.S. Cl. .................. 710/261; 710/267; 713/320

(58) Field of Classification Search ........... 710/260, 710/261, 267; 713/320
See application file for complete search history.

(56) References Cited

U.S. PATENT DOCUMENTS

| | | | | |
|---|---|---|---|---|
| 5,781,187 | A * | 7/1998 | Gephardt et al. | 710/309 |
| 6,564,371 | B1 * | 5/2003 | Goldman et al. | 717/127 |
| 6,662,272 | B2 * | 12/2003 | Olarig et al. | 711/129 |
| 7,152,169 | B2 * | 12/2006 | Cooper et al. | 713/320 |
| 2002/0099893 | A1 * | 7/2002 | Nguyen et al. | 710/260 |
| 2003/0065782 | A1 * | 4/2003 | Nishanov et al. | 709/226 |
| 2004/0225907 | A1 * | 11/2004 | Jain et al. | 713/320 |

FOREIGN PATENT DOCUMENTS

WO   WO 02/093375 A2   11/2002
WO   WO 03/044665 A1   5/2003

OTHER PUBLICATIONS

Anonymous, "IA-32 Intel Architeccture Software Developer's Manual, vol. 3, System Programming Guide," Internet Article, 'Online! 1999, XP-002312735.
Kobayashi, et al. U.S. Appl. No. 10/307,146, filed Nov. 30, 2002, "Apparatus and Method for Multi-Threaded Processors Performance Control," 36 pages.

* cited by examiner

*Primary Examiner*—Clifford Knoll
(74) *Attorney, Agent, or Firm*—David P. McAbee

(57) ABSTRACT

A method and apparatus for optimization of multiprocessor synchronization and allocation of system management memory space is herein described. When a system management interrupt (SMI) is received, a first processor checks the state of a second processor, which may be done by checking a storage medium storing values representative of the second processor's state. The first processor handles the SMI or waits for the second processor dependent on the state of the second processor. Furthermore, system management memory is allocated where a first system management memory space assigned to a first processor overlaps a second system management memory space assigned to a second processor, leaving first and second non-overlapping region.

29 Claims, 8 Drawing Sheets

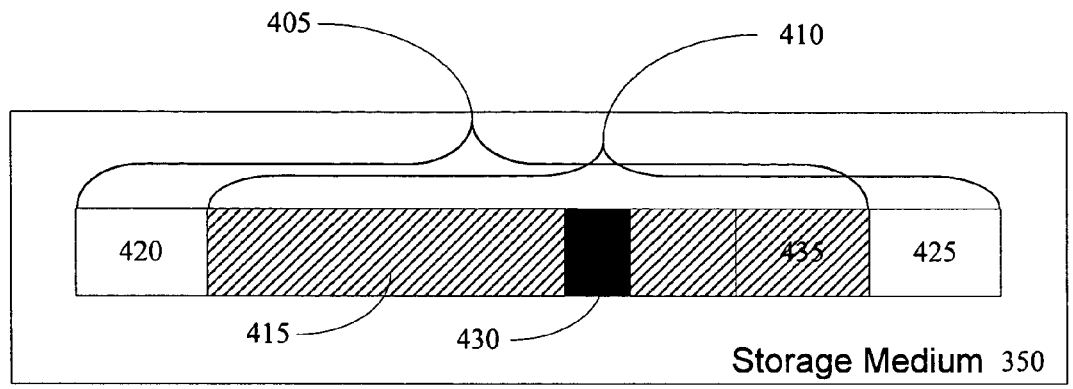

FIG. 4

| Value | Meaning |
|---|---|
| 00b 505 | The second processor is awake but not in SMI mode, so the first processor needs to wait for the second processor before handling the SMI 520 |
| 01b 510 | The second processor is sleeping/inactive, so the second processor may proceed to handle the SMI and should handle SMI's on the first processor 525 |
| 10b 515 | The second processor is awake/active and in SMI, so the first processor may proceed to handle the SMI and should handle SMI's on both the first and second processors 530 |

430

FIG. 5

EFFICIENT SYSTEM MANAGEMENT SYNCHRONIZATION AND MEMORY ALLOCATION

FIELD

This invention relates to the field of computer systems and, in particular, to system management mode optimizations.

BACKGROUND

Computer systems are becoming increasingly pervasive in our society including everything from small handheld electronic devices, such as personal digital data assistants and cellular phones, to application-specific electronic components, such as set-top boxes and other consumer electronics, to full mobile, desktop, and server systems. However, as systems become smaller in size and in price, the need for efficient memory allocation and system management becomes more important.

Server systems have been traditionally characterized by a significant amount of conventional memory and multiple physical processors in the same system (a multiprocessor system), wherein a physical processor refers to a single processor die or single package. The significant amount of resources available to a server system has lead to extremely inefficient allocation of memory space and wasted execution time.

Typically, there are two types of system management interrupts (SMIs) that may be generated in a system, which include hardware (asynchronous) SMIs, such as a battery being low, or software (synchronous) SMIs, such as an operating system (OS) requesting a processor to change frequency or power levels. Usually, a hardware SMI may be handled by either processor without the knowledge of the other processor's save-state area.

However, a software generated SMI may require all the processors in a multiprocessor system to enter SMI before handling the SMI request, because handling a software SMI may require the ability to access each processor's save-state area. The process of having a plurality of processors enter system management mode before handling a SMI is commonly known as synchronization.

Current multiprocessor systems typically utilize an inefficient timeout method for synchronizing processors. For example, if an SMI is received, each processor may wait a specified amount of time before handling the SMI to ensure each processor has entered system management mode (SMM). As an illustrative example, a processor, in a multiprocessor system, may wait the amount of time it takes to execute the longest instruction before handling the SMI to ensure the other processors have entered SMM. As a result, each processor may have already entered SMI, but the system is sitting idle wasting execution time waiting for the timeout period to expire.

Furthermore, present multiprocessor systems allocate system management memory space inefficiently. Due to current addressing limitations, a typical SMM area may require at least 64 kB. However, not all of this memory space is filled by SMM code and/or data. In addition, each processor is usually assigned separate and distinct 64 kB SMM spaces. Therefore, each 64 kB SMM space has memory space that is not be utilized, but is dedicated to an individual processor.

Nevertheless, these inefficient methods of synchronization and system management memory allocation are not limited to multiprocessor server systems. In fact, these inefficiencies may exist in other systems, such as mobile multiprocessor systems. Hyper-Threading Technology (HT) is a technology from Intel® Corporation of Santa Clara, Calif. that enables execution of threads in parallel using a signal physical processor. HT incorporates two logical processors on one physical processor (the same die). A logical processor is an independent processor visible to the operating system (OS), capable of executing code and maintaining a unique architectural state from other processor in a system. HT is achieved by having multiple architectural states that share one set of execution resources.

Therefore, HT enables one to implement a multi(logical) processor system in a mobile platform. As shown above, inefficient memory allocation and processor synchronization exist in traditional multiprocessor systems, such as server systems. Accordingly, as multiprocessor systems begin to infiltrate the mobile realm, where resources such as memory are limited, the need for optimizations of the aforementioned inefficiencies becomes even more important.

BRIEF DESCRIPTION OF THE DRAWINGS

The present invention is illustrated by way of example and not intended to be limited by the figures of the accompanying drawings.

FIG. 4 illustrates the storage medium of FIG. 3 with overlapping system management memory space.

FIG. 5 illustrates a portion of memory space from FIG. 4, which may store representations of multiple processor's system management states.

DETAILED DESCRIPTION

In the following description, numerous specific details are set forth such as examples of specific memory addresses, memory sizes, and component configurations in order to provide a thorough understanding of the present invention. It will be apparent, however, to one skilled in the art that these specific details need not be employed to practice the present invention. In other instances, well known components or methods, such as routine boot-up steps (e.g. power on self-test (POST)), specific system management mode (SMM) implementation, and specific system management interrupt handler code have not been described in detail in order to avoid unnecessarily obscuring the present invention.

The method and apparatus described herein are for optimization of multiprocessor synchronization and allocation of system management memory space. Synchronization of processors may occur at any time before entering a different processor mode. For example, when a plurality of processors in a multiprocessor system receive a SMI, they may synchronize before handling the SMI.

It is readily apparent to one skilled in the art, that the method disclosed for synchronizing multiple processors and efficiently allocation system management space between multiple processors may be applicable to any level computer system (personal digital assistants, mobile platforms, desktop platforms, and server platforms), as well as any number of processors. For example, a multiprocessor system with four or more processor may use this method to synchronize all four processors before entering a system management mode (SMM). As any plurality of processors would necessarily include two processors, only two processor synchronization will be discussed herein, so as to not obscure the invention with a more complex system.

Figure 1:
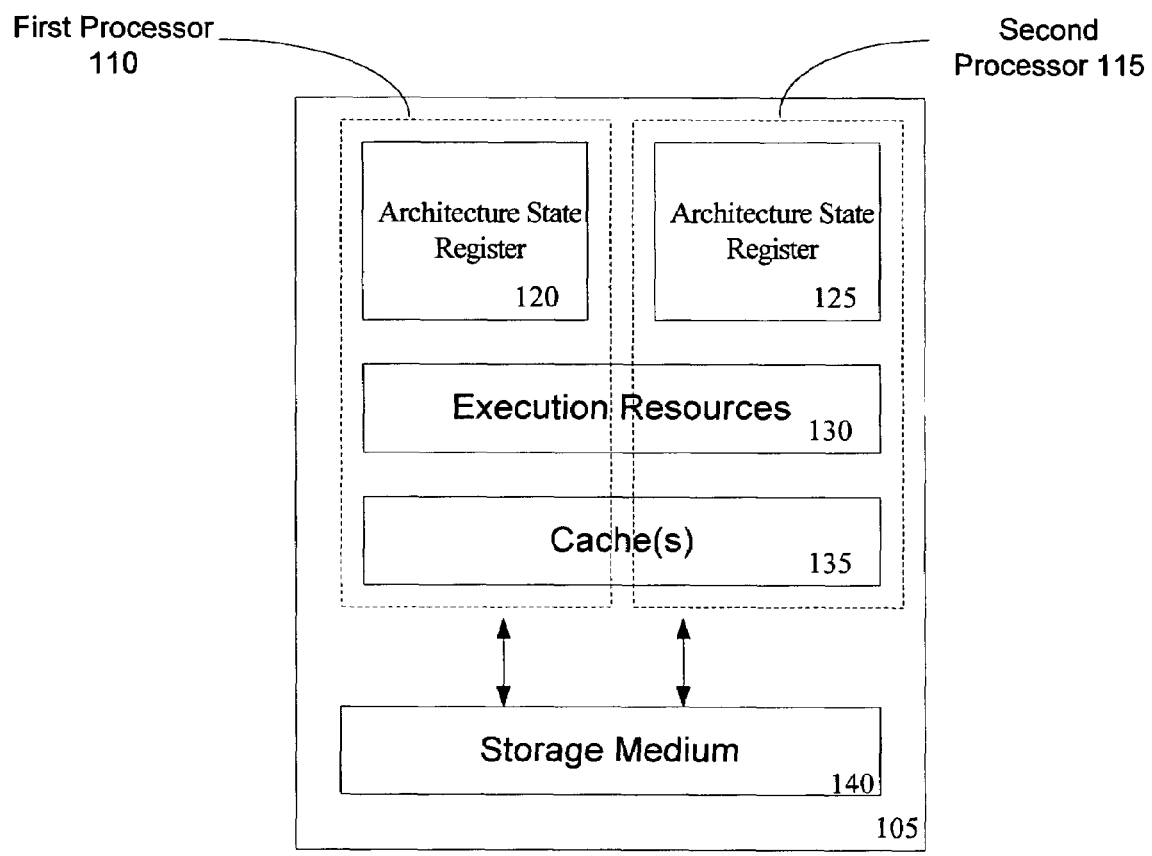
FIG. 1 illustrates a block diagram of a device with multiple processors that share execution resources, caches, and storage.
Figure 2A:
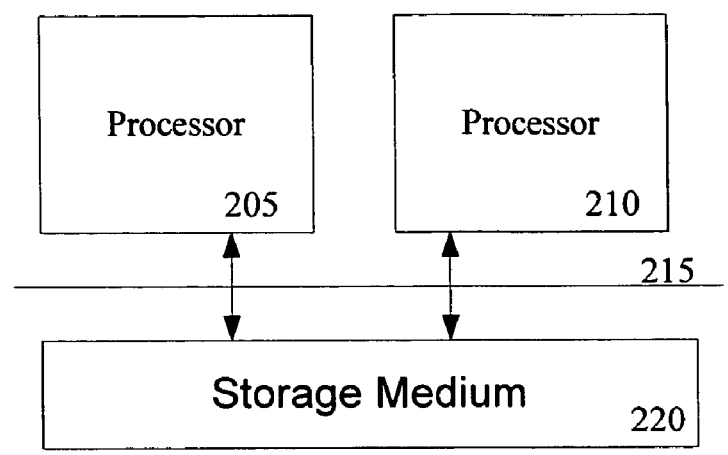
FIG. 2a illustrates a block diagram of a system with multiple processors coupled to a storage medium.
Figure 2B:
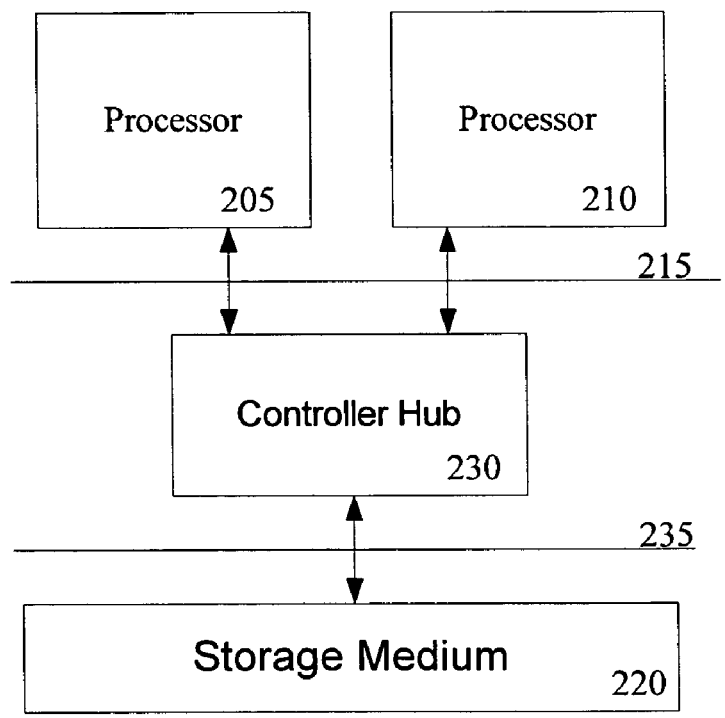
FIG. 2b illustrates a block diagram of a system with multiple processor coupled to a controller hub, which is coupled to memory
Figure 3:
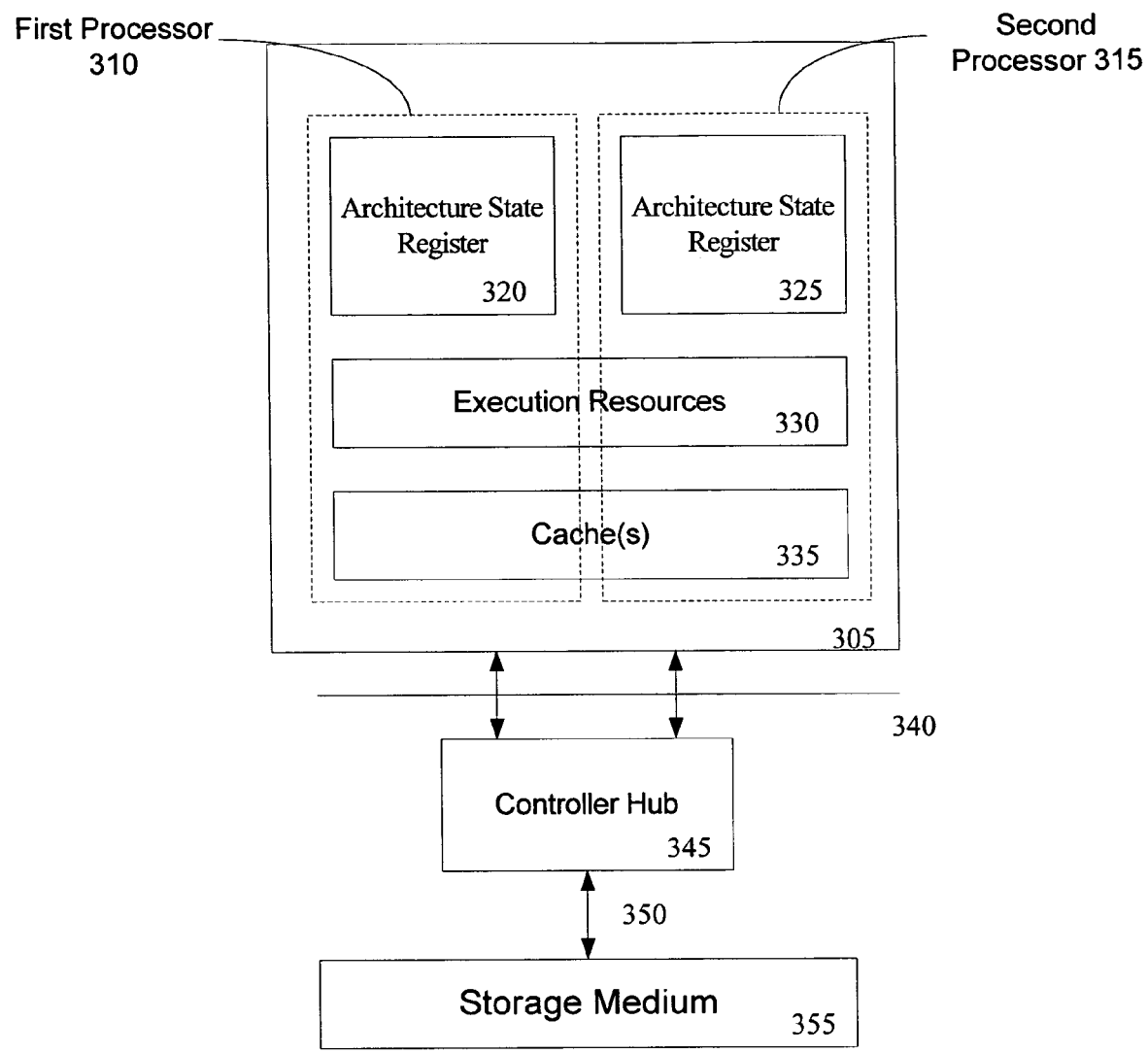
FIG. 3 illustrates a block diagram of a system with a physical processor having multiple logical processors.

FIGS. 1-3 depict illustrative examples of some hardware that may embody the methods described herein. As stated above, the methods described herein may be used in any multiprocessor system; therefore, the methods will only be described in detail with reference to FIG. 3, as not to obscure the invention with repetition.

FIG. 1 illustrates a block diagram of a device 105 with multiple logical processors. A physical processor refers to a physical processor die or a single package. A logical processor is an independent processor visible to the operating system (OS), capable of executing code and maintaining a unique architectural state from other processors in the system. Hyper-Threading Technology (HT) is a technology from Intel® Corporation of Santa Clara, Calif. that enables execution of threads in parallel using a signal physical processor. HT includes two logical processors on one physical processor and is achieved by duplicating the architectural state, with each architecture state sharing one set of processor execution resources.

Device 105 may include a first processor 110 and a second processor 115. Device 105 may be a physical processor. Device 105 may also be an embedded system, a single physical processor, or any other device having at least two processors. Processors 110 and 115 may be logical processors. For example, device 105 may include architecture state registers 120 and 125 that each holds a unique architecture state. It is readily apparent that device 105 may include more than two logical processors that each have an architecture state register associated with it to hold a separate architecture state. Processors 110 and 115 share the same execution resources 130, caches 135, and storage medium 140.

Storage medium 140 may be any style of storage where data may be stored. For example, storage medium 140 may be registers to store information. Storage medium 140 may also be another level of cache 135. Storage medium 140 may also be a form of system memory placed on device 105.

Turning to FIG. 2a, an illustrative example of a system with multiple processors is depicted. The system may include first processor 205 and second processor 210. Processor 205 and 210 may be physical processors, wherein each processor is on a separate die or separate package. The system may also include interconnect 215 to couple processors 205 and 210 to either storage medium 220 in FIG. 2a or controller hub 230 in FIG. 2b. As shown in FIG. 2b, controller hub 230 may also be coupled to storage medium 220 by second interconnect 235.

FIG. 3 illustrates an example of a system with multiple processors. Processor 305 may include first processor 310 and second processor 315, which share execution resources 330, cache 335, and system bus 340. Architecture state registers 320 and 325 may hold unique architecture states of processors 320 and 325 respectively. System bus 340 couples processor 305 to controller hub 345. Controller hub 345 may be coupled to storage medium 355 by a second bus 350. Storage medium 355 may be any device that stores data. For example, storage medium may be system memory. System memory may include synchronous random access memory (SRAM), dynamic random access memory (DRAM), synchronous dynamic random access memory (SDRAM), double data-rate RAM (DDR), Rambus (R), or any other type of system memory. Storage medium 355 may also be a register, flash memory, or another level of cache 335.

Looking at FIGS. 4 and 5, illustrative examples for allocation of system management mode (SMM) memory space for a first processor and for a second processor within storage medium 355 are depicted. FIG. 4 illustrates a first SMM memory space 405, which may be assigned to the first processor, and a second SMM memory space 410, which may be assigned to the second processor. First SMM space 405 and second SMM space 410 overlap to create overlapping region 415.

A first non-overlapping region 420, a second non-overlapping region 425, and/or third overlapping region 435 may be used to retain separate memory spaces for each processor. For example, separate memory spaces 420 and 425 may be used to store the first and second processor's save-state area. As another example, non-overlapping region 420 may be an offset between the first and second processor's base address (SMBase), while 435 and 425 are used to store the first and second processor's save-state area. FIG. 4 also illustrates a synchronization area 430 within overlapping region 415, which may be used to store synchronization information for a first processor and/or a second processor.

Turning to FIG. 5, an illustrative example of synchronization area 430 is depicted. Synchronization area 430 may be a synchronization byte that represents the state of a first processor and/or a second processor. As discussed later in reference to FIGS. 6-10, synchronization area 430 may be stored anywhere within storage medium 355 shown in FIG. 3. Cells 505, 510, and 515 illustrate examples of values that a synchronization byte may contain to represent the states depicted in cells 520, 525, and 530 respectively. Processor states, as well as FIGS. 4 and 5, will be discussed in more detail in reference to the methods described in FIGS. 6-10.

Figure 6:
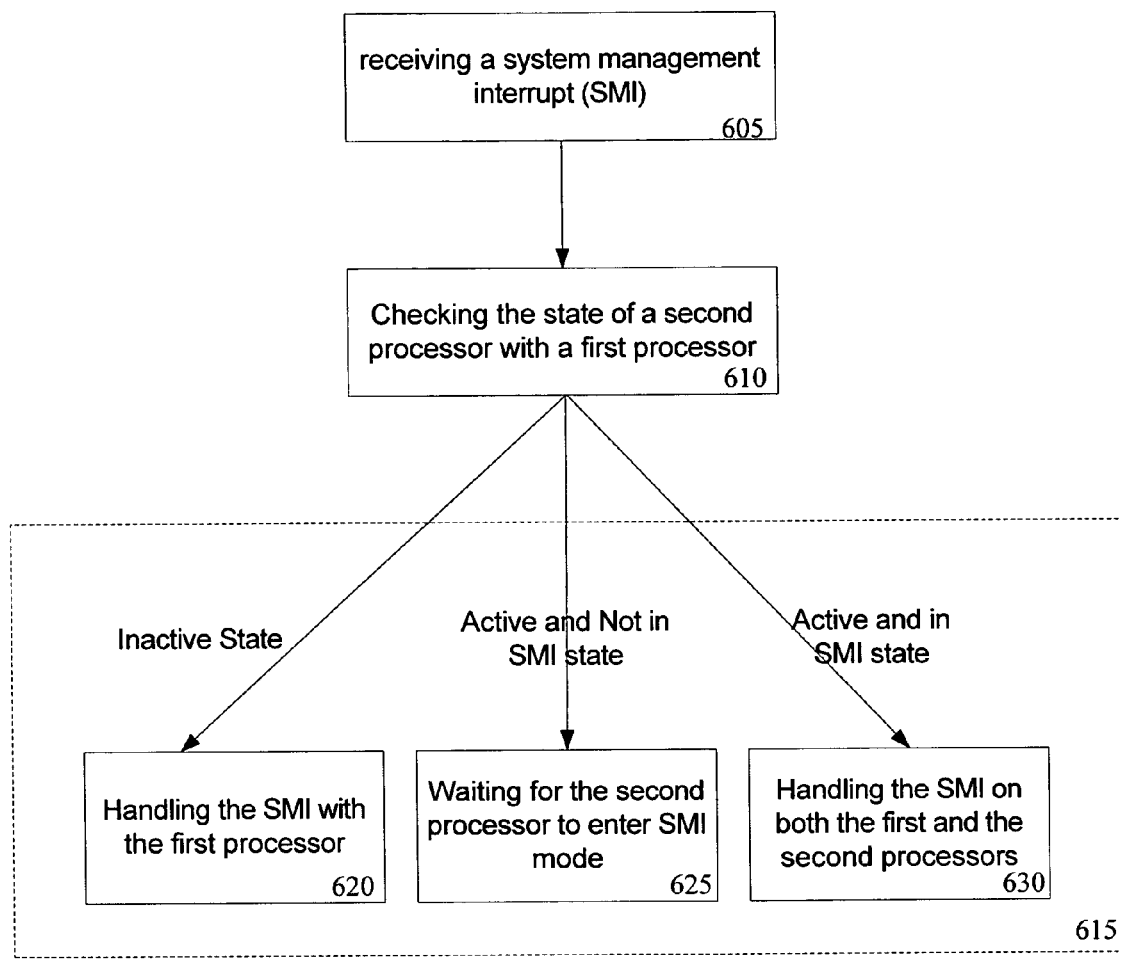
FIG. 6 illustrates a flow diagram for synchronizing a first and second processor before handling a system management interrupt.

Referring to FIG. 6, a method for synchronizing a first and second processor before handling an SMI is illustrated by a high-level flow diagram. In block 605, a SMI is received. Often a SMI is generated to request a service from a processor. A SMI may be generated by an asynchronous (hardware) or synchronous (software) event. When a SMI is generated in the system each processor in the system should receive/latch the SMI.

As an illustrative example, the first SMI in block 605 may be generated by a controller hub 345, shown in FIG. 3. As another example, the first SMI in block 605 may be generated by a controller (not depicted) located either within a first processor, a second processor, or separately in the system. As yet another example, the first SMI in block 605 may be generated by changing the logic level of a pin on a physical processor, such as processor 305 depicted in FIG. 3 or on a controller hub, such as controller hub 345 in FIG. 3.

Figure 7:
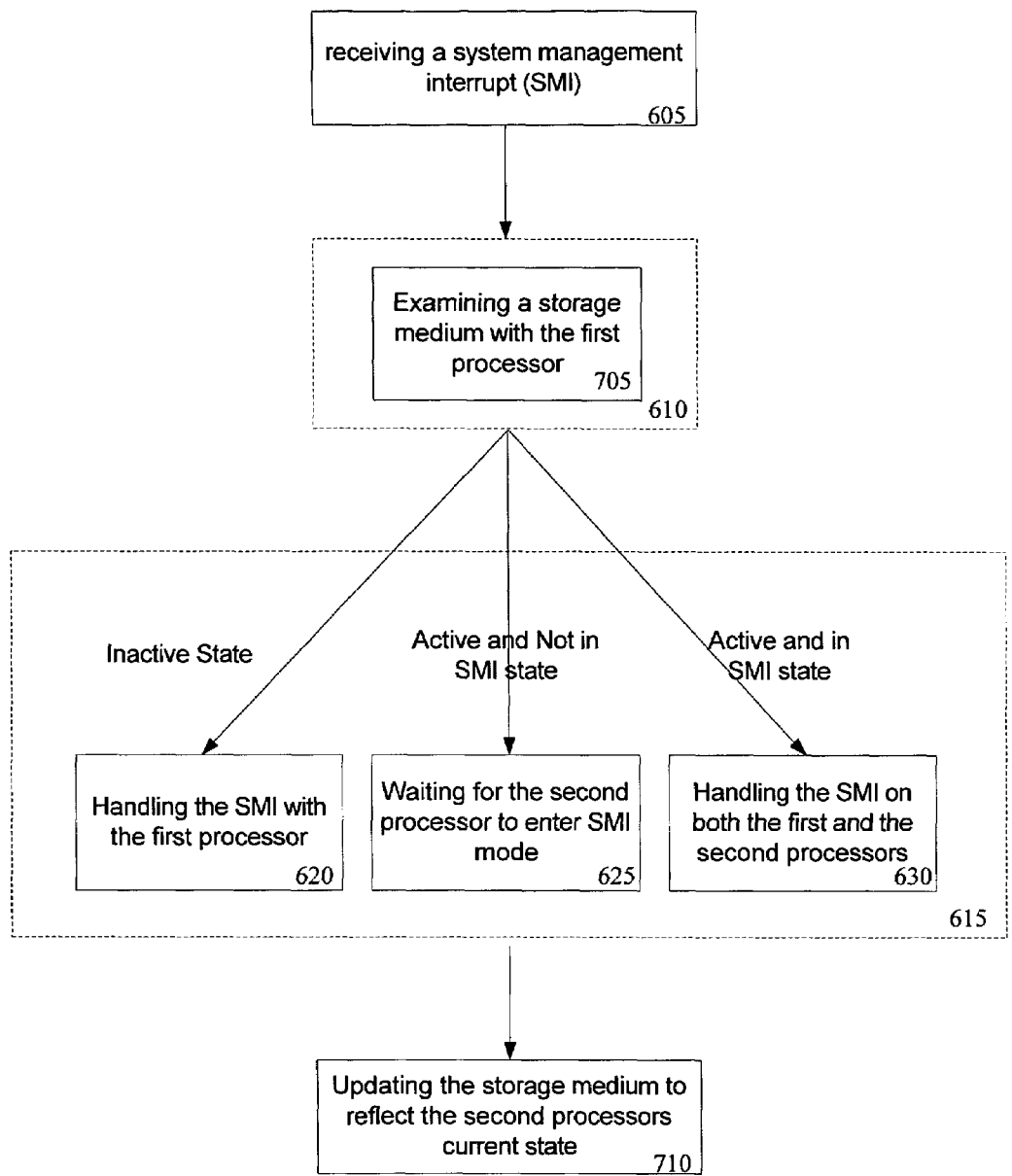
FIG. 7 depicts a flow diagram of an illustrative embodiment for synchronizing a first and second processor before handling an SMI and for updating a storage medium to reflect the new system management state.

In block 610, a first processor checks the state of a second processor. Checking the state of a second processor may be done through communication between processors. As an illustrative example, FIG. 7 depicts, in block 705, how a first processor may check the state of a second processor by examining a storage medium, such as storage medium 355 in FIG. 3 and FIG. 4.

Storage medium 355 may be any medium that stores information. As an example, storage medium 355 may be at least one register located in the first processor, the second processor, or the multiprocessor system (not depicted). As another example, storage medium 355 may be part of cache 335 or any other cache not located on processor 305. As yet another example, storage medium 355 may be system memory.

Storage medium 355 may hold direct state information of the first processor and/or second processor. Moreover, storage medium 355 may hold information representative of the first processor's and/or the second processor's state. For example, storage medium 355 may store state information in a synchronization area, such as synchronization area 430, depicted in FIGS. 4 and 5. Synchronization area 430, may store different values that represent different processor states.

As an instructive example, a first value stored in synchronization area 430 may represent that the second processor is in an inactive state. An inactive state may be any low power state, such as sleep, standby, suspend, hibernation, wait-for-SIPI, sleep, deep sleep, reset, or any other mode where the second processor does not respond to interrupts. Additionally, a second value stored in synchronization area 430 may represent that the second processor is in an active state but not in SMI mode, which is also commonly referred to as system management mode (SMM). An active state but not in SMI mode may be any state where the second processor is responding to interrupts and/or executing code, but is not in SMM. Furthermore, a third value stored in synchronization area 430 may represent that the second processor is in an active state and in SMI mode. An active state and in SMI mode, may be any state where the second processor is active and also in SMM.

Turning back to FIG. 5, illustrative examples of representative values that may be stored in synchronization area 430 as a synchbyte are shown. When synchronization area 430 stores a first value 01b in cell 510, that first value represents that the second processor, is inactive/sleeping, as described in cell 520. However, when synchronization area 430 stores a second value 00b, as shown in cell 505, that second value represents that the second processor is active and not in SMI mode, so the first processor may wait for the second processor as described in cell 520. Similarly, when synchronization area 430 stores a third value 10b, as shown in cell 515, that third value represents that the second processor is active and in SMI mode. Therefore, the first processor may proceed to handle the SMI on both the first and second processors, as described in cell 530.

Referring again to FIG. 6, the SMI from block 605 is handled in block 615. Often handling an SMI entails servicing the request made either by hardware or software. Handling an SMI may include anything that services the SMI request generated. For example, handling an SMI may include executing SMI handler code to service the SMI.

As shown in block 620, the first processor may handle the SMI generated in block 605 without waiting for the second processor to enter SMI mode, if synchronization area 430 stores a value, which represents that the second processor is in an inactive state. Once the second processor begins to wake-up (enter a state where it responds to interrupts), the second processor may update the storage medium to reflect its current state, such as in block 710 shown in FIG. 7.

When entering a state where the second processor responds to interrupts and is not in SMI mode, the value in synchronization area 430 should be updated by the second processor to reflect an active but not in SMI mode state. While synchronization area 430 represents an active and not in SMI mode state, the first processor should wait for second processor to enter SMI mode before handing the SMI from block 605, as shown in block 625. Likewise, when the second processor enters SMI mode it should update the synchronization area to a value, 10b in FIG. 5, which represents that the second processor is now in SMI mode. If the state of the second processor is active and in SMI mode, then the SMI may be handled with either the first processor or second processor on both first and second processors.

Figure 8:
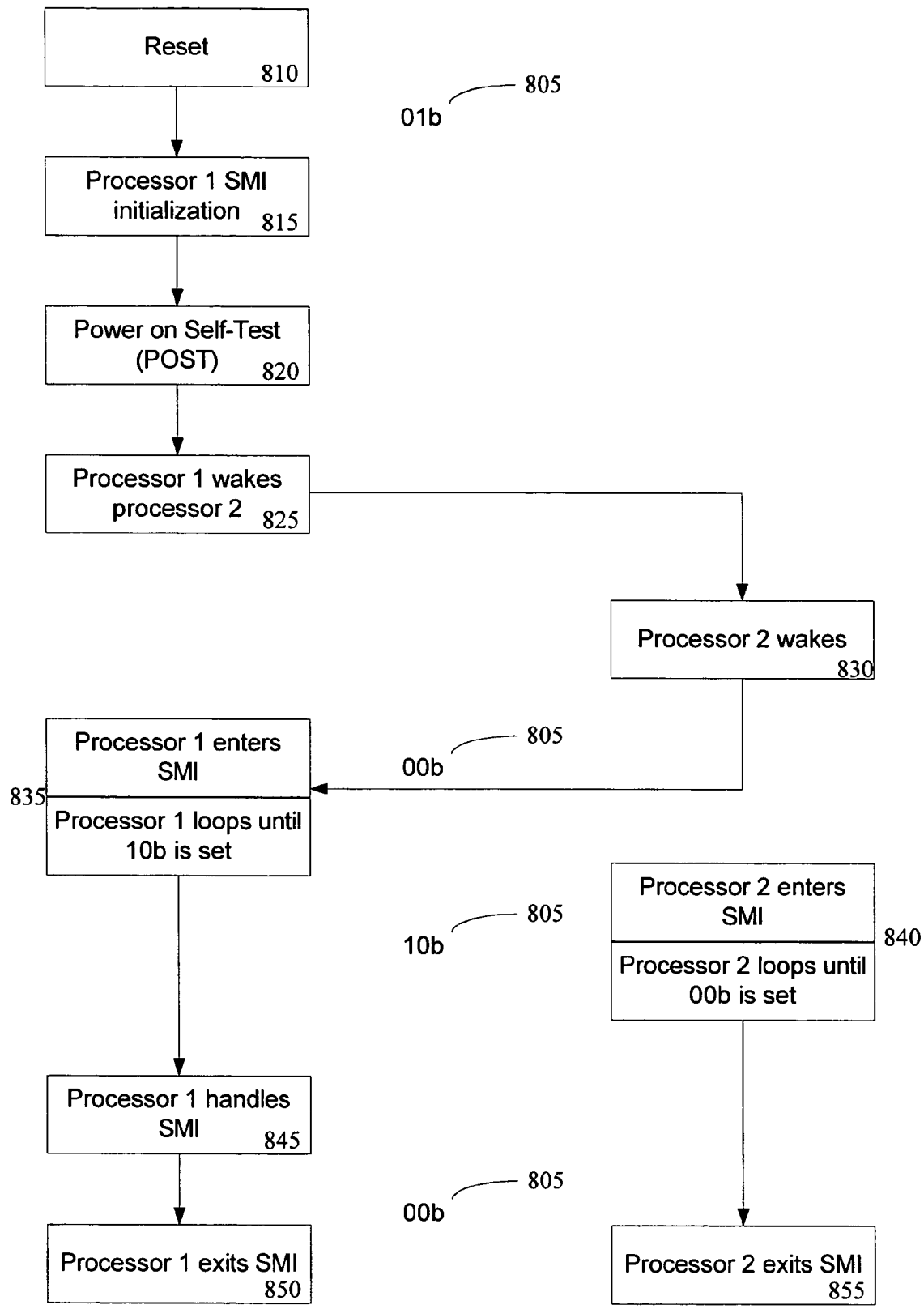
FIG. 8 depicts an illustrative example of a synchronization byte being used during a boot process to synchronize a first and second processor before handling a SMI.

Taking a look at FIG. 8, an illustrative example of optimized synchronization during a two processor boot sequence is shown in high-level flow diagram format. Synchronization value 805 is shown continuously through the flow diagram to illustrate what value synchronization area 430, shown in FIGS. 4 and 5, may hold. Synchronization value 805 may be stored anywhere in storage medium 355. For this example synchronization value 805 should coincide with FIG. 5's table of values to make the illustration simpler. Therefore, upon initialization/reset in block 810 synchronization value 805 may be set to 01b, representing that a second processor is inactive. At this time, if any SMIs are generated, the second processor may latch/receive the SMI, but should not handle them.

However, a first processor, after receiving an SMI, may check the state of the second processor by examining synchronization area 430 to read the synchronization value 805. The first processor may then proceed to handle the SMI without waiting for the second processor, if the synchronization value 805 is 01b, representing that the second processor is inactive. The first processor may also complete other routine boot steps, such as initializing SMI in block 815, completing power on self test (POST) in block 820, and waking the second processor in block 825.

When the second processor wakes-up in block 830, it should set synchronization value 805 to 00b, to represent that it is active but not in SMI mode. The first processor may enter SMI, in block 835, and should check the state of the second processor by examining synchronization value 805. Since synchronization value 805 should now be set to 00b, the first processor may wait/loop until the second processor enters SMI and sets synchronization value 805 to 10b.

The second processor, in block 840, may then enter SMI mode and set synchronization value 805 to 10b to represent it is active and in SMI mode. At this point, the second processor may wait/loop in SMI mode until the first processor has set synchronization value 805 to 00b to represent it is active but not in SMI mode. During the second processor's waiting, the first processor may proceed to handle the SMI in block 845 on both the first and the second processors. Once the first processor has handled the SMI on both the first and second processor, it may exit SMI mode and set synchronization value 805 to 00b in block 850. The second processor may then exit SMI mode in block 855.

Figure 9:
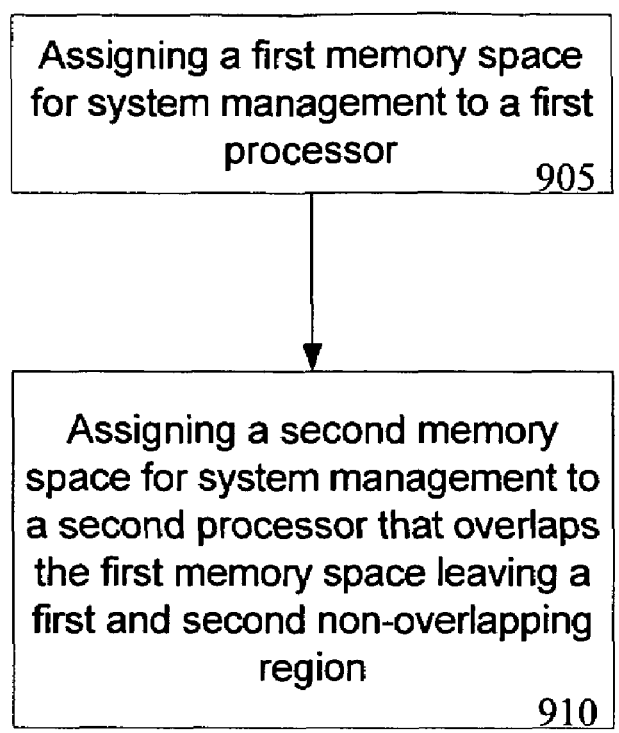
FIG. 9 illustrates a flow diagram for efficiently assigning system management memory space to a first and second processor.

Referring to FIG. 9, a method for efficiently allocating system management memory space is depicted. In block 905 a first system management memory space/range, such as first memory space/range 405 in FIG. 4, is assigned to a first processor. In block 910, a second system management memory space/range, such as second memory space/range 410, is assigned to a second processor, so that first memory space 405 and second memory space 410 overlap to create an overlapping region/range 415. The overlapping of first memory space 405 and second memory space 410 may leave a first and second non-overlapping region/range, such as non-overlapping regions/ranges 420 and 425 respectively, shown in FIG. 4.

Overlapping region 415 may be used to store system management data such as SMI handler code. Overlapping region 415 may also be used to store one or both of the first and second processor's save-state area. It is readily apparent that first and second non-overlapping regions 420 and 425 may be placed in different orientation to overlapping region 415 than depicted in FIG. 4.

Non-overlapping regions 420 and 425 may also be used to store any sort of data. For example, first non-overlapping region 420 may store the save-state area for a first processor, while second non-overlapping region 425 may store the save-state area for a second processor. As another example, first non-overlapping region 420 may be an offset between the first and second processor's SMM space, while save-state area 435, in overlapping region 415, and non-overlapping region 425 may be used to separately store a first and second processor's save-state area. Furthermore, non-overlapping regions 420 and 425 may be any size in memory. As an illustrative example, first and second non-overlapping regions 420 and 425 may be the size of each processor's save-state area. A typical save-state area may be 2 kB but may also vary in size. The offset between first memory space 405 and second memory space 410, as shown by non-overlapping region 420 may vary in size as well. For example, the offset may be the size of the save-state area or it may be the size of the largest SMI handler code stored in either memory space.

A portion of overlapping region 415 may also store the system management state of both processors in a synchronization area 430, as shown in FIG. 4; even though, synchronization area 430 may be placed anywhere in storage medium 355. However, it may be advantageous to store synchronization are 430 in the overlapping region, so both processors may read information from and modify synchronization area 430 easily.

As illustrated above, the need for efficient synchronization and memory allocation in system management is becoming greater as multiprocessor systems have fewer resources available to them. Allowing the processor's to communicate each others state either directly or through a storage medium, allows a multiprocessor system to efficiently synchronize, not wasting any execution time or resources. Furthermore, overlapping each processor's system management memory space/range saves valuable memory space, as well as allows the synchronization information to be readily stored and modifiable by any processor.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   receiving a system management interrupt (SMI);
   checking a state of a second processor with a first processor; and
   in response to the state of the second processor being inactive, handling the SMI with the first processor;
   in response to the state of the second processor being active and not in SMI mode (SMM), waiting for the second processor to enter SMM;
   in response to the state of the second processor being active and in SMM, handling the SMI on both the first and the second processors.

2. The method of claim 1, wherein checking the state of a second processor with a first processor comprises: examining a storage medium with the first processor, wherein the storage medium stores values representative of the second processor's state.

3. The method of claim 2, wherein the storage medium is system memory.

4. The method of claim 3, wherein the system memory stores values representative of the second processor's state in a synchbyte.

5. The method of claim 4, wherein the synchbyte, when having a first value, represents that the second processor is in an inactive state.

6. The method of claim 4, wherein the synchbyte, when having a second value, represents that the second processor is active but not in SMM.

7. The method of claim 4, wherein the synchbyte, when having a third value, represents that the second processor is in an active state and in SMM.

8. The method of claim 2, wherein the storage medium is a register.

9. The method of claim 8, wherein the register is located in the second processor.

10. The method of claim 2, wherein the storage medium's default value represents an inactive state for the second processor.

11. The method of claim 2, further comprising: updating the storage medium with the second processor to reflect the second processor's current state.

12. The method of claim 11, wherein updating the storage medium comprises: writing a value to the storage medium to represent an inactive state, in response to the second processor going into a low power state.

13. The method of claim 11, wherein updating the storage medium comprises: writing a value to the storage medium to represent an active and not in SMM state, in response to the second processor waking-up and not being in SMM.

14. The method of claim 11, wherein updating the storage medium comprises: writing a value to the storage medium to represent an active and in SMM state, in response to the second processor entering SMM.

15. The method of claim 1, further comprising: generating the SMI before receiving the SMI.

16. The method of claim 15, wherein generating the SMI is done through software.

17. The method of claim 15, wherein generating the SMI is done through hardware.

18. The method of claim 1, wherein the first and second processors are logical processors.

19. The method of claim 1, wherein the first and second processors are physical processors.

20. A system comprising:
    a first and a second processor; and
    a storage medium, coupled to the first and the second processor, to hold a system management state of at least the second processor, wherein the first processor and the second processor, in response to receiving a system management interrupt (SMI), are to synchronize entrance into a system management mode (SMM) to handle the SMI based on the system management state of at least the second processor held in the storage medium.

21. The system of claim 20, wherein the first and the second processor to synchronize entrance into the SMM comprises: the first processor handling the SMI without waiting for the second processor to enter SMM in response to the system management state of at least the second processor indicating the second processor is inactive.

22. The system of claim 20, wherein the first and the second processor to synchronize entrance into the SMM comprises: the first processor waiting for the second processor to enter SMM and update the system management state of at least the second processor to indicate the second processor has entered SMM in response to the system management state of at least the second processor indicates the second processor active and not in SMM.

23. The system of claim 20, wherein the first and the second processor to synchronize entrance into the SMM comprises: the SMI being handled on the first and second processors in response to the system management state of at least the second processor indicating the second processor is active and in SMM.

24. The system of claim 20, wherein the storage medium includes a system memory.

25. The system of claim 24, wherein the system memory is to hold a synchbyte that represents the system management state of at least the second processor, and wherein the storage medium further includes a cache memory coupled between the system memory and the first and the second processor to cache the synchbyte.

26. The system of claim 20, wherein the storage medium includes a register.

27. The system of claim 20, wherein the storage medium includes a flash memory.

28. The system of claim 25, wherein the first and second processors are logical processors, which share access to the cache, the first processor, the second processor, and the cache located on a single package.

29. The system of claim 20, wherein the first and second processors are physical processors.

* * * * *